United States Patent
Okayama et al.

(10) Patent No.: US 10,234,683 B2
(45) Date of Patent: Mar. 19, 2019

(54) HEAD-UP DISPLAY, AND VEHICLE EQUIPPED WITH HEAD-UP DISPLAY

(71) Applicant: Panasonic Intellectual Property Management Co., Ltd., Osaka (JP)

(72) Inventors: Hiroaki Okayama, Nara (JP); Satoshi Kuzuhara, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 311 days.

(21) Appl. No.: 15/072,779

(22) Filed: Mar. 17, 2016

(65) Prior Publication Data

US 2016/0202479 A1 Jul. 14, 2016

Related U.S. Application Data

(63) Continuation of application No. PCT/JP2015/002002, filed on Apr. 9, 2015.

(30) Foreign Application Priority Data

Apr. 14, 2014 (JP) .................. 2014-082469
Mar. 5, 2015 (JP) .................. 2015-043834

(51) Int. Cl.
*B60R 1/00* (2006.01)
*B60R 11/02* (2006.01)
(Continued)

(52) U.S. Cl.
CPC .......... *G02B 27/0101* (2013.01); *B60R 1/00* (2013.01); *B60R 11/02* (2013.01); *G02B 17/023* (2013.01);
(Continued)

(58) Field of Classification Search
CPC ............ G02B 27/0101; G02B 27/0149; G02B 2027/0161; G02B 2027/013; G02B 2027/011
(Continued)

(56) References Cited

U.S. PATENT DOCUMENTS

| 4,714,320 A | 12/1987 | Banbury |
| 5,140,465 A * | 8/1992 | Yasui ................. G02B 27/01 |
| | | 359/631 |

(Continued)

FOREIGN PATENT DOCUMENTS

| JP | 2-112536 | 4/1990 |
| JP | 6-175075 | 6/1994 |

(Continued)

OTHER PUBLICATIONS

Extended European Search Report dated Feb. 16, 2017 in corresponding European Application No. 15780082.2.
(Continued)

*Primary Examiner* — Zachary W Wilkes
(74) *Attorney, Agent, or Firm* — Wenderoth, Lind & Ponack, L.L.P.

(57) ABSTRACT

A head-up display is mounted to a vehicle having a windshield, and includes a display element configured to display an image, a first optical system configured to reflect the image displayed by the display element and project the image onto the windshield; and a second optical system configured to reflect the image displayed by the display element and project the image onto the windshield. The image projected with the first optical system is projected onto the windshield at a position below a position of the image projected with the second optical system.

8 Claims, 9 Drawing Sheets

(51) Int. Cl.
*G02B 17/02* (2006.01)
*G02B 27/01* (2006.01)

(52) U.S. Cl.
CPC ........ *G02B 27/01* (2013.01); *B60R 2300/205* (2013.01); *G02B 2027/0123* (2013.01); *G02B 2027/0145* (2013.01); *G02B 2027/0165* (2013.01)

(58) Field of Classification Search
USPC .............................................. 345/7; 359/633
See application file for complete search history.

(56) References Cited

U.S. PATENT DOCUMENTS

| | | | |
|---|---|---|---|
| 5,625,493 | A | 4/1997 | Matsumura et al. |
| 6,542,305 | B2 * | 4/2003 | Nakamura ......... G02B 27/0101 359/630 |
| 7,508,356 | B2 * | 3/2009 | Kanamori ............ G02B 17/023 345/7 |
| 7,561,966 | B2 * | 7/2009 | Nakamura ........... G01C 21/365 340/461 |
| 8,867,138 | B2 * | 10/2014 | Kobayashi ......... G02B 27/0101 359/630 |
| 9,477,080 | B2 * | 10/2016 | Ando ................. G02B 27/0101 |
| 2002/0018182 | A1 | 2/2002 | Aoki |
| 2003/0016451 | A1 | 1/2003 | Aoki et al. |
| 2004/0113866 | A1 | 6/2004 | Aoki et al. |
| 2005/0154505 | A1 | 7/2005 | Nakamura et al. |
| 2006/0071877 | A1 | 4/2006 | Kanamori et al. |
| 2011/0228403 | A1 | 9/2011 | Masuda et al. |
| 2013/0242404 | A1 | 9/2013 | Kobayashi |
| 2014/0254023 | A1 | 9/2014 | Chuang et al. |

FOREIGN PATENT DOCUMENTS

| | | |
|---|---|---|
| JP | 2003-29196 | 1/2003 |
| JP | 2004-130892 | 4/2004 |
| JP | 2006-106254 | 4/2006 |
| JP | 2007-333995 | 12/2007 |
| JP | 2008-151992 | 7/2008 |
| JP | 2010-256867 | 11/2010 |
| JP | 2011-83952 | 4/2011 |
| JP | 2011-191715 | 9/2011 |
| JP | 2012-062051 | 3/2012 |
| JP | 2012-179935 | 9/2012 |
| JP | 2013-032087 | 2/2013 |
| JP | 2013-83675 | 5/2013 |
| TW | M461063 | 9/2013 |

OTHER PUBLICATIONS

Extended European Search Report dated Feb. 24, 2017 in corresponding European Application No. 15779663.2.

Extended European Search Report dated Feb. 24, 2017 in corresponding European Application No. 15779711.9.

International Search Report dated Jun. 23, 2015 in corresponding International Application No. PCT/JP2015/002002 (with English translation).

* cited by examiner

HEAD-UP DISPLAY, AND VEHICLE EQUIPPED WITH HEAD-UP DISPLAY

BACKGROUND

1. Technical Field

The present disclosure relates to a head-up display that allows an observer to visually recognize a display image projected on a reflection unit as a virtual image, and a vehicle equipped with the head-up display.

2. Background Art

Unexamined Japanese Patent Publication No. 2013-83675 discloses a display device that applies a sense of perspective to a display image to create a visually presentation effect. This display device includes a projector, a first screen displaying a first image, a second screen displaying a second image, a prism sheet, and a reflection unit. With this configuration, the display device can allow a driver to visually recognize two display images with a sense of perspective.

SUMMARY

A head-up display according to the present disclosure is mounted to a vehicle having a windshield and allows an observer to visually recognize a virtual image. The head-up display includes a display element configured to display an image; a first optical system configured to reflect the image displayed by the display element and project the image onto the windshield; and a second optical system configured to reflect the image displayed by the display element and project the image onto the windshield, wherein the image projected with the first optical system is projected onto the windshield at a position below a position of the image projected with the second optical system.

DESCRIPTION OF EMBODIMENTS

Hereinafter, exemplary embodiments will be described in detail with reference to the accompanying drawings as necessary. It is noted, however, that descriptions in more detail than necessary will sometimes be omitted. For example, detailed descriptions of well-known items and duplicate descriptions of substantially the same configuration will sometimes be omitted. This is to avoid unnecessary redundancy in the following description and to facilitate understanding by those skilled in the art.

Note that the accompanying drawings and the following descriptions are provided so as to facilitate fully understanding of the present disclosure by those skilled in the art, and these are not intended to limit the subject matter defined by the claims.

First Exemplary Embodiment

A first exemplary embodiment will be described below with reference to FIGS. 1 to 4.

[1-1. Configuration]

[1-1-1. Entire Configuration]

Figure 1:
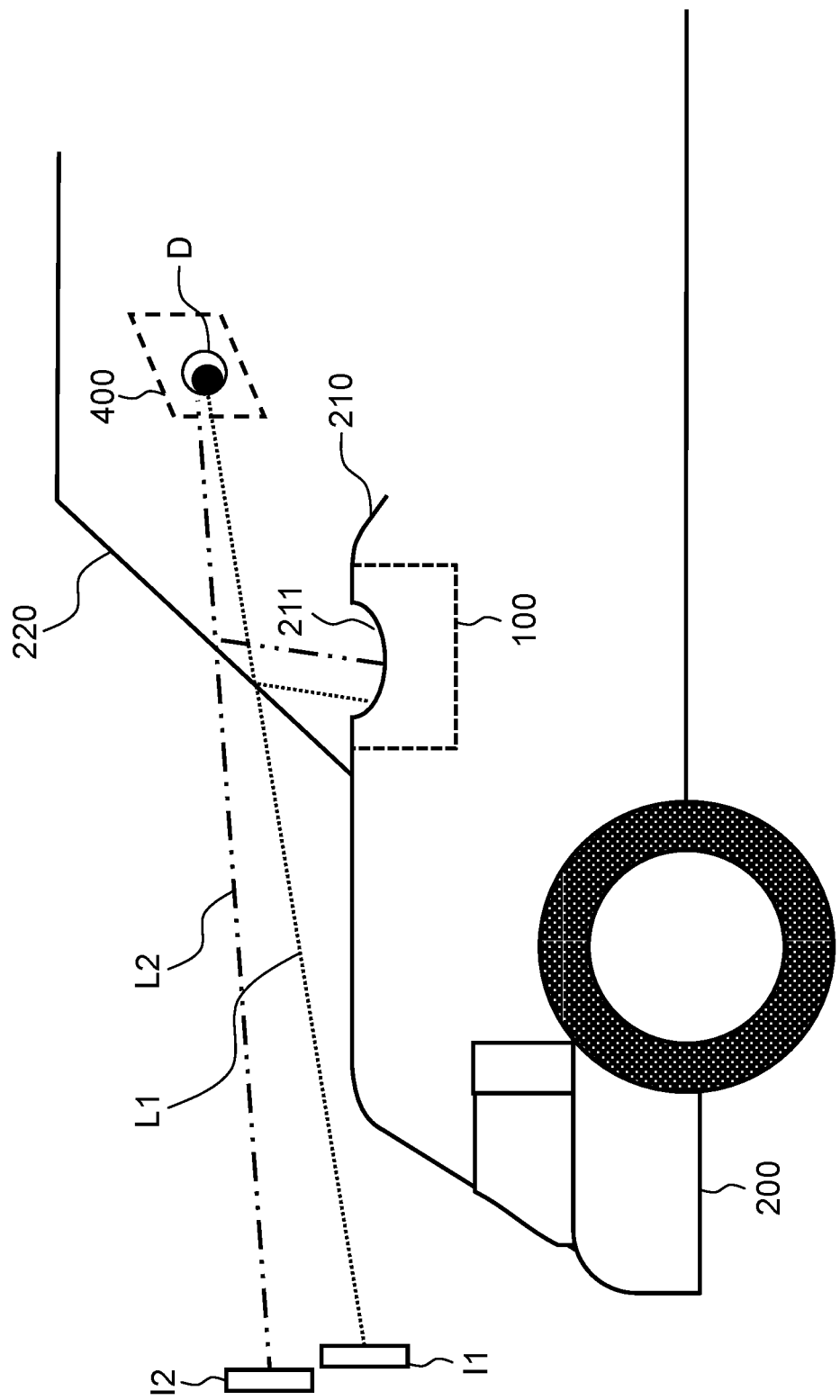
FIG. 1 is a schematic diagram illustrating a configuration of a vehicle equipped with a head-up display according to the present disclosure.

FIG. 1 is a diagram illustrating a configuration of car 200 (one example of a vehicle) equipped with head-up display 100 according to the present disclosure. Head-up display 100 is disposed inside dashboard 210 of car 200 as illustrated in FIG. 1. Observer D visually recognizes virtual images I1 and I2 which are generated by a display element and an optical system mounted in head-up display 100 and reflected through windshield 220. Head-up display 100 projects an image onto windshield 220 of car 200 to form virtual images I1 and I2 at the opposite side of observer D relative to windshield 220. Observer D visually recognizes virtual images I1 and I2. A dotted line and a chain line in FIG. 1 indicate center optical paths L1 and L2 of projected images, and in the description below, center optical paths L1 and L2 are indicated by a dotted line or a chain line.

Figure 2:
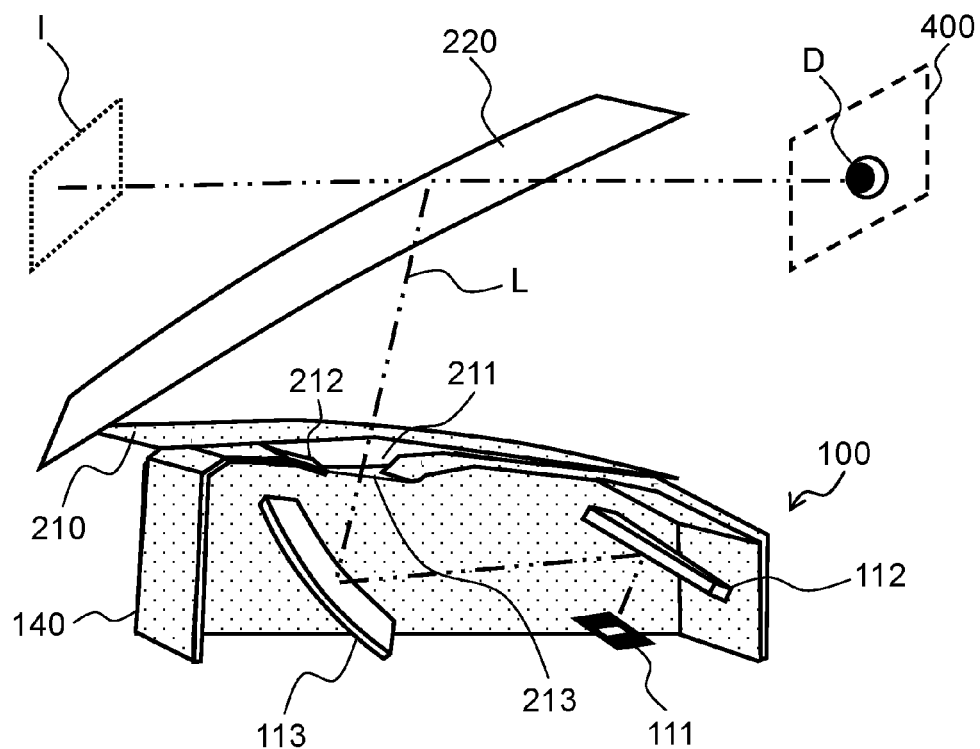
FIG. 2 is a schematic diagram illustrating a configuration of the head-up display according to the present disclosure.

FIG. 2 is a schematic diagram illustrating a configuration of head-up display 100 according to the present disclosure. FIG. 2 is a partially cutout diagram of head-up display 100.

As illustrated in FIG. 2, head-up display 100 according to the present disclosure includes, in housing 140 having opening 211, first display element 111 displaying an image and a projection optical system projecting an image displayed by first display element 111 onto windshield 220. With this configuration, observer D can visually recognize a virtual image I of the display image through windshield 220. Virtual images I1 and I2 of the image projected on windshield 220 can visually be recognized with no missing part at eye box 400 that is a predetermined visual recognition region.

Opening 211 of housing 140 forms an emission opening from which projection light of the projection optical system is emitted. Translucent antireflection cover 213 such as a transparent resin plate may be mounted to opening 211 of housing 140 so as to cover opening 211.

A liquid crystal display device, an organic EL display device, or a plasma display is used for first display element 111, for example. A predetermined image is displayed in a display region of first display element 111 according to an image signal input from display control unit not illustrated.

The projection optical system includes first mirror 112 serving as a first reflection member disposed at the side of first display element 111, and second mirror 113 serving as a second reflection member disposed at the side of opening 211 on an optical path from first display element 111 to windshield 220.

Figure 3:
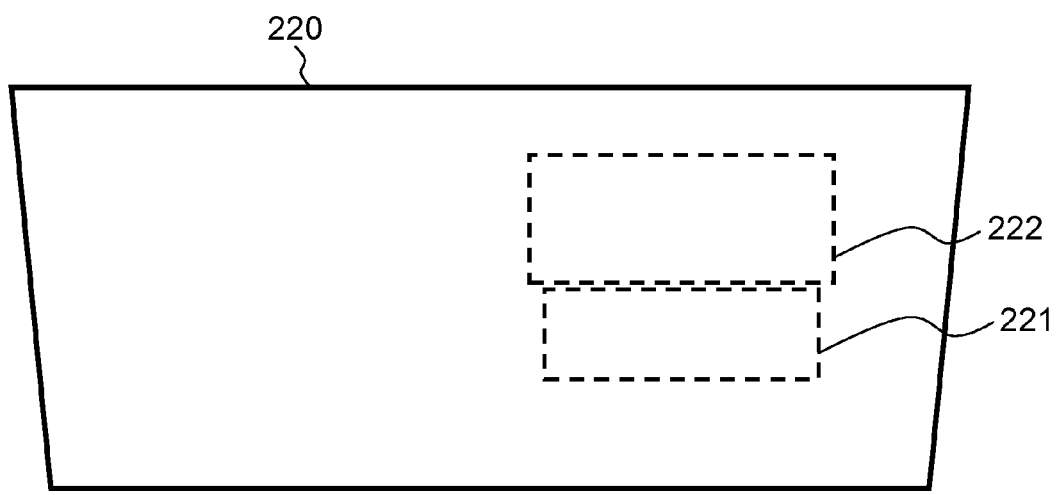
FIG. 3 is a diagram illustrating a windshield viewed from an observer, when the head-up display according to the present disclosure is activated.

FIG. 3 is a diagram illustrating a positional relation between first region 221 where virtual image I1 is displayed and second region 222 where virtual image I2 is displayed, as viewed from observer D.

Virtual image I1 is located below virtual image I2 as viewed from observer D. A speed meter or the like which is always displayed is displayed in first region 221 where virtual image I1 is displayed, and a display content for drawing attention of observer D, such as a warning, or a display content according to a traveling condition is displayed in second region 222 where virtual image I2 is displayed. As used herein, the terms "up", "down", "above", and "below" mean relative to the perspective of the observer D positioned in the vehicle during normal operation of the vehicle.

[1-1-2. Arrangement Configuration of Display Device]

Figure 4:
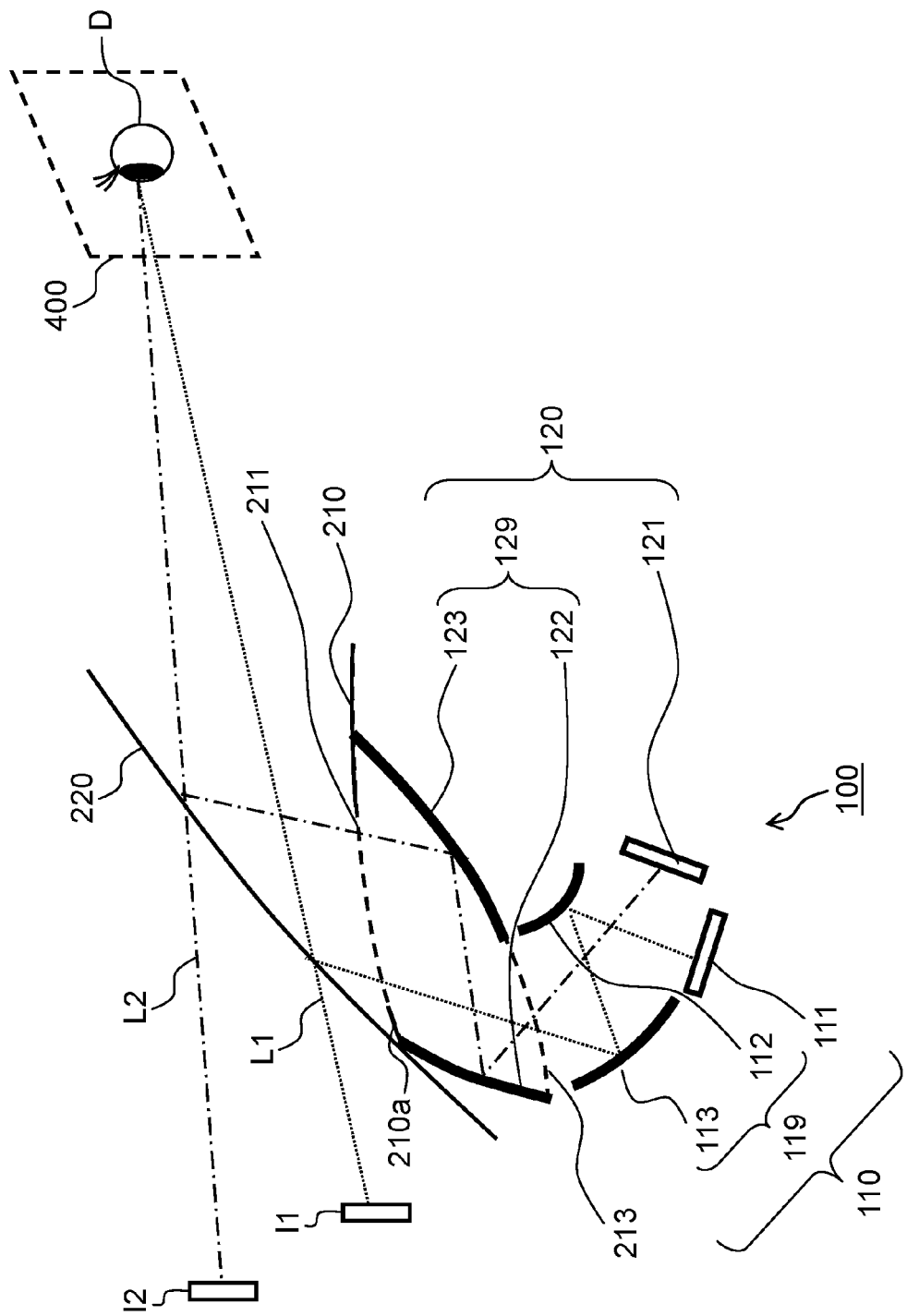
FIG. 4 is a schematic diagram illustrating a configuration of a head-up display according to a first exemplary embodiment.

FIG. 4 schematically illustrates the configuration of head-up display 100 according to the first exemplary embodiment. Head-up display 100 includes inside first display device 110 and second display device 120 provided above first display device 110.

First display device 110 includes first display element 111 and first optical system 119. First optical system 119 includes first mirror 112 and second mirror 113. A reflection surface of first mirror 112 in first optical system 119 is convex, and a reflection surface of second mirror 113 is concave.

Second display device 120 includes second display element 121 and second optical system 129. Second display element 121 is provided vertically below first mirror 112 in first display device. Second optical system 129 includes first mirror 122 and second mirror 123. Reflection surfaces of first mirror 122 and second mirror 123 in second optical system 129 are concave.

Second mirror 123 in second optical system 129 reflects a light flux of a display image reflected by first mirror 122 located at the front of car 200 toward windshield 220. A tangent normal vector near the center of the displayed image on the reflection surface of second mirror 123 includes a component in the forward direction of car 200 (i.e., a direction in which the observer faces during normal vehicle operation). With this configuration, when external light is incident through windshield 220, external light reflected on second mirror 123 is not directly guided toward observer D. Even when external light incident through windshield 220 is reflected on second mirror 123, and then, reflected at least once on a reflection member such as windshield 220, this light is prevented from being guided toward observer D.

First mirror 112 and second mirror 113 in first display device 110, and first mirror 122 and second mirror 123 in second display device 120 may be semi-transparent mirrors that reflect a part of incident light flux, or mirrors that reflect entire light flux.

First mirror 122 in second display device 120 may be formed from a part of front panel (decorative member) 210a composing the front part of dashboard 210. Second mirror 123 in second display device 120 is provided inside dashboard 210. Second mirror 123 may be formed from a part of antireflection cover 213 mounted to cover first optical system 119, or may be continuously formed with antireflection cover 213.

A screen generating an image using a liquid crystal display device, an organic light-emitting diode (electroluminescence), a plasma display, or a projector can be used for first display element 111 and second display element 121.

[1-2. Operation]

As illustrated in FIG. 4, first display device 110 displays virtual image I1 in the first exemplary embodiment. First display device 110 reflects an image displayed by first display element 111 through first mirror 112, reflects this image through second mirror 113, and then reflects this image through windshield 220, thereby guiding this image to point-of-view region 400 of observer D so as to allow observer D to visually recognize this image as virtual image I1. Second display device 120 displays virtual image I2. Second display device 120 reflects an image displayed by second display element 121 through first mirror 122, reflects this image through second mirror 123, and then reflects this image through windshield 220, thereby guiding this image to point-of-view region 400 of observer D so as to allow observer D to visually recognize this image as virtual image I2. Center optical path L1 of the image of first display device 110 is reflected on windshield 220 at the position lower than center optical path L2 of the image of second display device 120.

The positional relation between first display device 110 and second display device 120 will be described below. As illustrated in FIG. 4, a light flux of the image emitted from second display element 121 indicated with center optical path L2 passes between first display element 111 and first mirror 112 of first display device 110. Then, this light flux passes between first mirror 112 of first display device 110 and second mirror 113 of first display device 110, and then passes between second mirror 113 of first display device 110 and windshield 220 to be incident on first mirror 122 of second display device 120. The light flux reflected on first mirror 122 of second display device 120 passes between second mirror 113 of first display device 110 and windshield 220, and is incident on second mirror 123 of second display device 120. The light flux reflected on second mirror 123 of second display device 120 is incident on windshield 220, reflected thereon, and then, guided to point-of-view region 400 of observer D to be visually recognized as virtual image I2.

As described above, in the first exemplary embodiment, the light flux of the image emitted from second display element 121 crosses the light flux emitted from first display element 111 five times before being incident on windshield 220, and then, guided toward observer D to be visually recognized as virtual image I2. The light flux of the image emitted from first display element 111 crosses the light flux emitted from second display element 121 four times before being incident on windshield 220. After being reflected on windshield 220, this light flux crosses the light flux once, and then, guided toward observer D to be visually recognized as virtual image I1. Specifically, the light flux emitted from first display element 111 and the light flux emitted from second display element 121 cross each other four times in the inside of dashboard 210 and once in the outside of dashboard 210, until they are guided toward observer D to be visually recognized as virtual images I1 and I2.

[1-3. Effect]

The display device is separated into first display device 110 and second display device 120, whereby the size of entire head-up display 100 in the depth direction (in the vertical direction in FIG. 4) and the size in the front-back direction (in the horizontal direction in FIG. 4) of car 200 can be decreased. With this, head-up display 100 can be downsized, and a display of a virtual image on a large screen is enabled with two virtual images I1 and I2. In general, vehicle structures such as a reinforcement or air conditioner duct are provided in a dashboard of car 200 equipped with head-up display 100. Head-up display 100 according to the first exemplary embodiment can decrease the size in its depth direction and the size in the front-back direction of car 200, thereby being capable of preventing interference with the vehicle structures.

In addition, head-up display 100 enables setting of a display distance or display size for each of virtual images displayed by first display device 110 and second display device 120.

Head-up display 100 according to the first exemplary embodiment uses a part of front panel 212 and a part of antireflection cover 213 respectively as first mirror 122 and second mirror 123 in second display device 120. In this case, vehicle-specific structures are used as second optical system 129 of second display device 120, whereby second display device 120 can further be downsized. Accordingly, further downsizing of entire head-up display 100 can be implemented.

Second Exemplary Embodiment

Head-up display 100 according to a second exemplary embodiment will be described below with reference to FIG. 5. The second exemplary embodiment is different from the first exemplary embodiment in that second display element 121 in second display device 120 is located vertically above first display device 110.

[2-1. Configuration]

Figure 5:
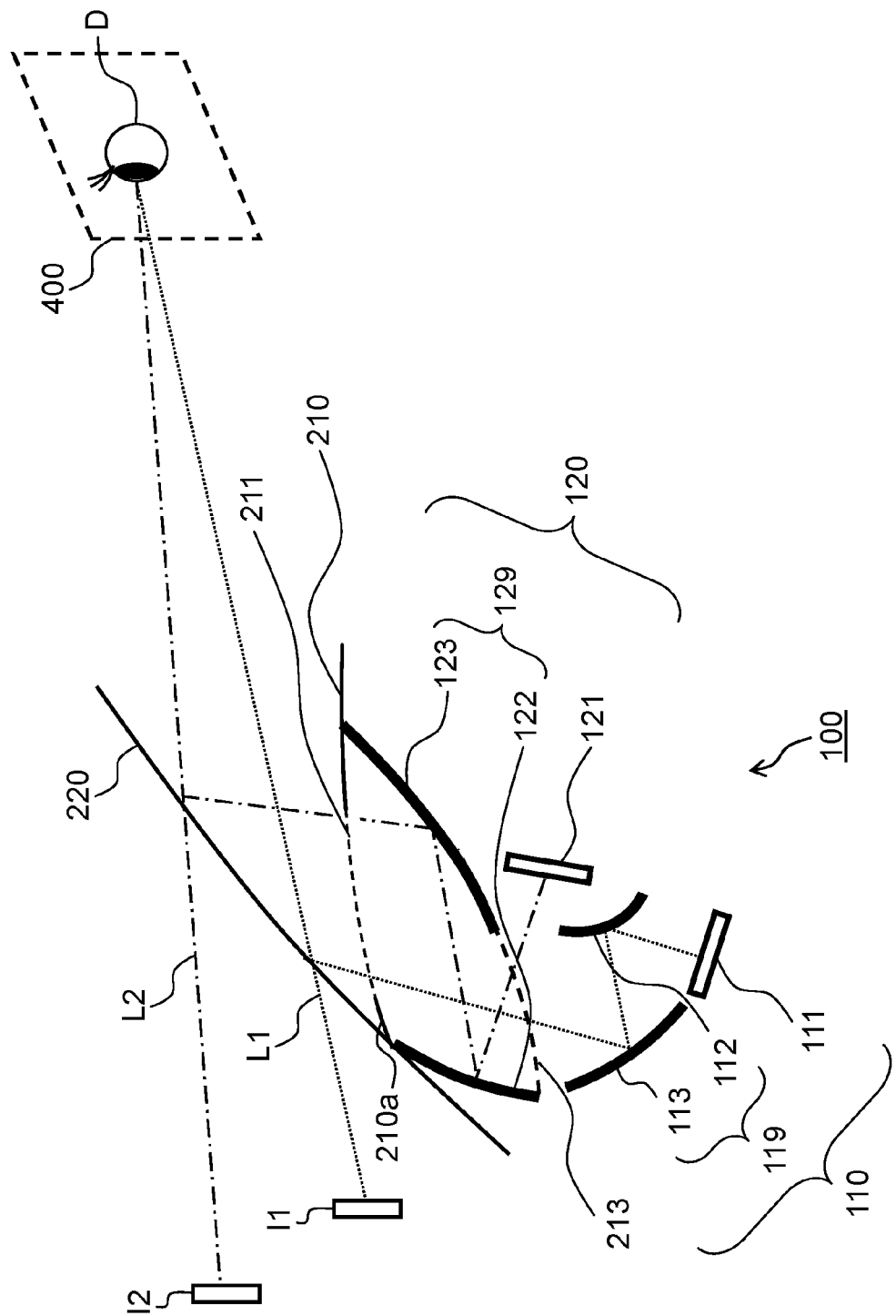
FIG. 5 is a schematic diagram illustrating a configuration of a head-up display according to a second exemplary embodiment.

FIG. 5 is a schematic diagram illustrating the configuration of head-up display 100 according to the second exemplary embodiment. Head-up display 100 includes first display device 110 and second display device 120 provided above first display device 110 in the vertical direction.

First display device 110 includes first display element 111 and first optical system 119. First optical system 119 includes first mirror 112 and second mirror 113. Desirably, a reflection surface of first mirror 112 in first optical system 119 is convex, and a reflection surface of second mirror 113 is concave.

Second display device 120 includes second display element 121 and second optical system 129. Second optical system 129 includes first mirror 122 and second mirror 123. Second display element 121 is provided vertically below second mirror 123 and vertically above first mirror 112 in first display device 110. Desirably, a reflection surface of first mirror 122 in second optical system 129 is concave, and a reflection surface of second mirror 123 is concave. Second mirror 123 in second optical system 129 reflects a light flux incident from first mirror 122 located at the front of car 200 toward windshield 220. The reflection surface of second mirror 123 is concave, and the tangent normal at the position where the center (L2) of the image from second display element 121 is reflected has a vector component in the forward direction of car 200. With this configuration, even when external light incident through windshield 220 is reflected on second mirror 123, this external light is not directly guided toward observer D. Even when external light incident through windshield 220 is reflected on second mirror 123, and then, reflected on a reflection member such as windshield 220, this light is prevented from being guided toward observer D.

First mirror 112 and second mirror 113 in first display device 110, and first mirror 122 and second mirror 123 in second display device 120 may be semi-transparent mirrors that reflect a part of incident light flux, or mirrors that reflect entire light flux.

First mirror 122 in second display device 120 may be formed from a part of front panel (decorative member) 210a composing the front part of dashboard 210. Second mirror 123 in second display device 120 is provided inside dashboard 210. Second mirror 123 may be formed from a part of antireflection cover 213 mounted to cover first optical system 119, or may be continuously formed with antireflection cover 213.

A screen generating an image using a liquid crystal display device, an organic light-emitting diode (electroluminescence), a plasma display, or a projector can be used for first display element 111 and second display element 121.

[2-2. Operation]

As illustrated in FIG. 5, first display device 110 displays virtual image I1 in the second exemplary embodiment. First display device 110 reflects an image displayed by first display element 111 through first mirror 112, reflects this image through second mirror 113, and then reflects this image through windshield 220, thereby guiding this image to point-of-view region 400 of observer D so as to allow observer D to visually recognize this image as virtual image I1. Second display device 120 displays virtual image I2. Second display device 120 reflects an image displayed by second display element 121 through first mirror 122, reflects this image through second mirror 123, and then reflects this image through windshield 220, thereby guiding this image to point-of-view region 400 of observer D so as to allow observer D to visually recognize this image as virtual image I2. Center optical path L1 of the image of first display device 110 is reflected on windshield 220 at the position lower than center optical path L2 of the image of second display device 120.

Different from the first exemplary embodiment, the light flux emitted from second display element 121 passes neither between first display element 111 and first mirror 112 of first display device 110 nor between first mirror 112 and second mirror 113 in the second exemplary embodiment. The light flux emitted from second display element 121 of second display device 120 passes between second mirror 113 of first display device 110 and windshield 220, and is incident on first mirror 122 of second display device 120. The light flux incident on first mirror 122 of second display device 120 is reflected, passes between second mirror 113 of first display device 110 and windshield 220, and is incident on second mirror 123 of second display device 120. The light flux incident on second mirror 123 of second display device 120 is reflected thereon, reflected on windshield 220, and then, guided to point-of-view region 400 of observer D to be visually recognized as virtual image I2 by observer D.

[2-3. Effect]

The display device is separated into first display device 110 and second display device 120, whereby the size of entire head-up display 100 in the depth direction (in the vertical direction in FIG. 5) and the size in the front-back direction (in the horizontal direction in FIG. 5) of car 200 can be decreased. With this, head-up display 100 can be downsized, and a display of a virtual image on a large screen is enabled with two virtual images I1 and I2. In addition, head-up display 100 enables setting of a display position or display size for each of virtual images displayed by first display device 110 and second display device 120.

In addition, as in the first exemplary embodiment, head-up display 100 according to the second exemplary embodiment uses a part of front panel 212 and a part of antireflection cover 213 respectively as first mirror 122 and second mirror 123 in second display device 120. Thus, further downsizing of entire head-up display 100 can be implemented.

In the present exemplary embodiment, second display element 121 in second display device 120 is provided vertically below second mirror 123 and vertically above first mirror 112 in first display device 110. With this, each of first display device 110 and second display device 120 can be formed as a module, whereby assembling property can be enhanced.

Third Exemplary Embodiment

Head-up display 100 according to a third exemplary embodiment will be described below with reference to FIG. 6.

[3-1. Configuration]

Figure 6:
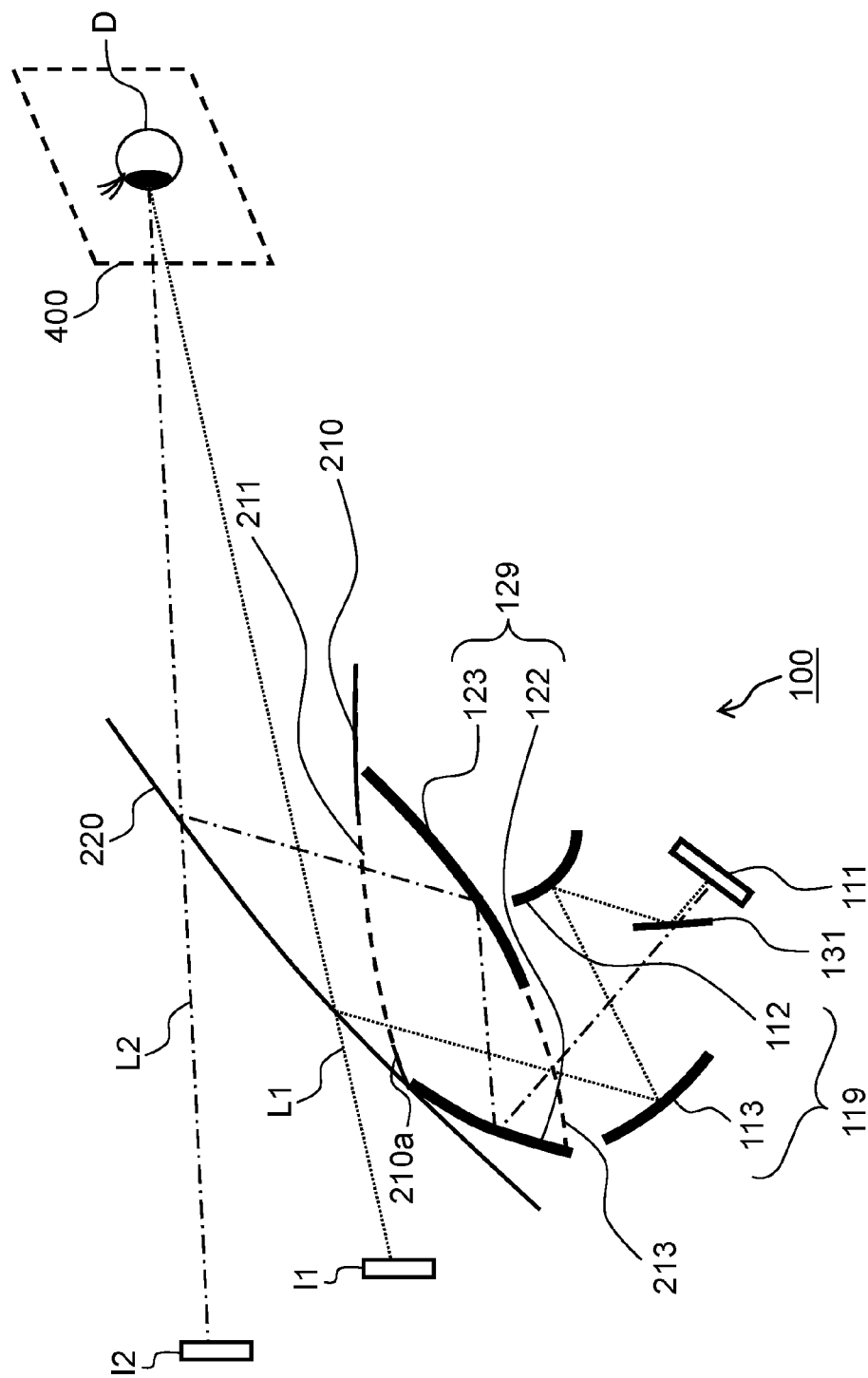
FIG. 6 is a schematic diagram illustrating a configuration of a head-up display according to a third exemplary embodiment.

FIG. 6 is a schematic diagram illustrating the configuration of head-up display 100 according to the third exemplary embodiment. Head-up display 100 includes inside first optical system 119, second optical system 129, first display element 111, and optical device 131 that splits a light flux.

First optical system 119 includes first mirror 112 and second mirror 113. Desirably, a reflection surface of first mirror 112 in first optical system 119 is convex, and a reflection surface of second mirror 113 is concave.

Second optical system 129 includes first mirror 122 and second mirror 123. The reflection surface of second mirror 123 in second optical system 129 is desirably concave. Second optical system 129 is provided above first optical system 119 in the vertical direction.

Optical device 131 has a function of splitting a light flux emitted from first display element 111 for each time. Alternatively, optical device 131 may have a function of splitting a light flux emitted from first display element 111 for each wavelength band. Alternatively, optical device 131 may have a function of splitting a light flux emitted from first display element 111 according to polarizing direction.

Second mirror 123 in second optical system 129 reflects a light flux incident from first mirror 122 located at the front of car 200 toward windshield 220. The reflection surface of second mirror 123 is concave, and the tangent normal at the position where the center (L2) of the image from first display element 111 is reflected has a vector component in the forward direction of car 200. With this configuration, even when external light incident through windshield 220 is reflected on second mirror 123, this external light is not directly guided toward observer D. Even when external light incident through windshield 220 is reflected on second mirror 123, and then, reflected on a reflection member such as windshield 220, this light is prevented from being guided toward observer D.

First mirror 112 and second mirror 113 in first optical system 119, and first mirror 122 and second mirror 123 in second optical system 129 may be semi-transparent mirrors that reflect a part of incident light flux, or mirrors that reflect entire light flux.

First mirror 122 in second optical system 129 may be formed from a part of front panel (decorative member) 210a composing the front part of dashboard 210. Second mirror 123 in second optical system 129 may be formed from a part of antireflection cover 213 mounted inside dashboard 210 to cover first optical system 119.

A screen generating an image using a liquid crystal display device, an organic light-emitting diode (electroluminescence), a plasma display, or a projector can be used for first display element 111.

[3-2. Operation]

As illustrated in FIG. 6, virtual image I1 is generated by first optical system 119 in the third exemplary embodiment. Specifically, an image displayed by first display element 111 is reflected on optical device 131, reflected on first mirror 112, then reflected on second mirror 113, and then reflected on windshield 220, thereby being guided to point-of-view region 400 of observer D and visually recognized by observer D as virtual image I1.

Virtual image I2 is generated by second optical system 129. Specifically, an image displayed by first display element 111 passes through on optical device 131, is reflected on first mirror 122, then reflected on second mirror 123, and then reflected on windshield 220, thereby being guided to point-of-view region 400 of observer D and visually recognized by observer D as virtual image I2.

In the present exemplary embodiment, optical device 131 can switch between reflection and transmittance. Specifically, optical device 131 can switch between reflection and transmittance every certain period of time, thereby being capable of alternately guiding the light flux emitted from first display element 111 to first optical system 119 and second optical system 129. The reflection and transmittance of optical device 131 is switched in association with a light flux of an image for virtual image I1 and a light flux of an image for virtual image I2. With this, virtual image I1 displayed in first region 221 and virtual image I2 displayed in second region 222 can be shown as if they are simultaneously displayed. In this case, reflection and transmittance is switched by optical device 131 with a speed equal to or higher than 48 frames per second, and this provides less flickering to observer D. As a result, observer D can visually recognize virtual image I1 and virtual image I2 as if they are always simultaneously displayed. In addition, brightness of a virtual image to be displayed can be adjusted by changing a ratio of a time for reflecting a light flux emitted from first display element 111 and a time for transmitting the light flux with optical device 131.

It is possible that only one virtual image is displayed without displaying the other virtual image. In this case, optical device 131 can use a dimming film that switches between transmittance and reflection according to a liquid crystal shutter or a voltage application, for example.

In addition, two virtual images can simultaneously be displayed by using a device, which has different property between transmittance and reflection according to a wavelength band, for optical device 131. The device having such property is a dichroic mirror, for example.

Optical device 131 may be an optical element in which transmittance property and reflection property are changed according to a polarizing direction. For example, such optical element can transmit one polarized light out of the light flux emitted from first display element 111 and guide this light to second optical system 129, while it can reflect the other polarized light and guide this light to first optical system 119 for display. The optical element having this property is a polarizing beam splitter, for example.

[3-3. Effect]

The display device includes first display element 111, optical device 131 that splits a light flux, first optical system 119, and second optical system 129, whereby the size of head-up display 100 in the depth direction (in the vertical direction in FIG. 6) and the size in the front-back direction (in the horizontal direction in FIG. 6) of car 200 can be decreased. With this, head-up display 100 can be downsized, and a display of a virtual image on a large screen is enabled with two virtual images I1 and I2. In addition, head-up display 100 enables setting of a display position or display size for each of virtual images to be displayed.

In addition, as in the first exemplary embodiment, head-up display 100 according to the third exemplary embodiment uses a part of front panel 212 and a part of antireflection cover 213 respectively as first mirror 122 and second mirror 123 in second optical system 129. Thus, further downsizing of entire head-up display 100 can be implemented. Furthermore, first display element 111 is shared by first optical system 119 and second optical system 129, whereby low-cost head-up display 100 can be provided.

In addition, as in the first exemplary embodiment, head-up display 100 according to the third exemplary embodiment uses a part of front panel 212 and a part of antireflection cover 213 respectively as first mirror 122 and second mirror 123 in second optical system 129. Thus, further downsizing of entire head-up display 100 can be implemented.

Fourth Exemplary Embodiment

A fourth exemplary embodiment will be described below with reference to FIG. 7.

[4-1. Configuration]

Figure 7:
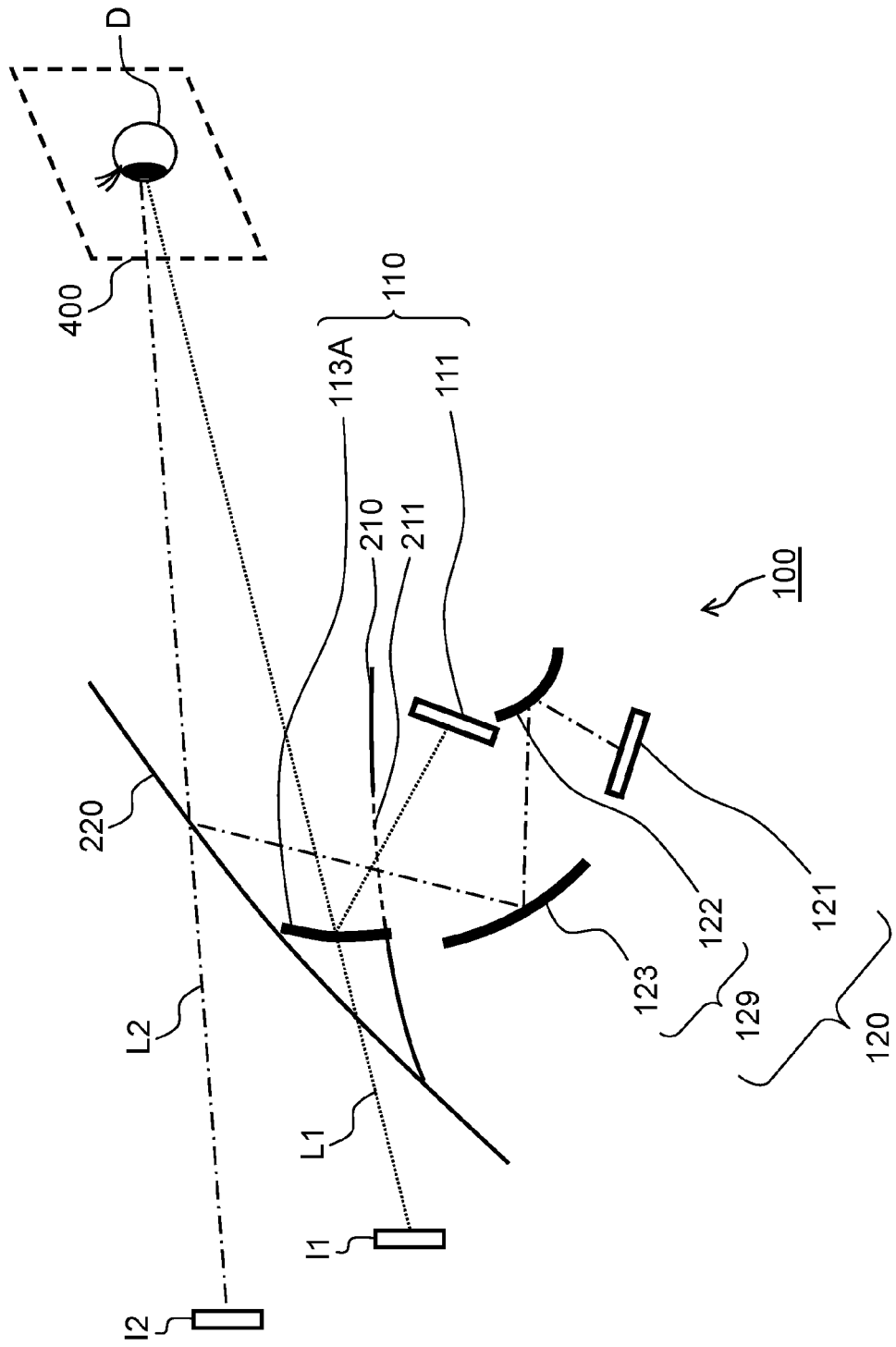
FIG. 7 is a schematic diagram illustrating a configuration of a head-up display according to a fourth exemplary embodiment.

FIG. 7 is a diagram schematically illustrating head-up display 100 mounted to car 200 according to the fourth exemplary embodiment. Head-up display 100 includes first display device 110 and second display device 120. First display device 110 includes first display element 111 and combiner 113A. The reflection surface of combiner 113A is desirably concave. First display element 111 is disposed at the back of car 200 relative to opening 211, and mounted with a display surface facing combiner 113A.

Second display device 120 includes second display element 121 and second optical system 129. Second optical system 129 includes first mirror 122 and second mirror 123 having larger reflection surface than first mirror 122. First mirror 122 is disposed at the back of car 200 relative to opening 211. On the other hand, second mirror is disposed at the front of car 200 relative to opening 211. Desirably, a reflection surface of first mirror 122 in second optical system 129 is convex, and a reflection surface of second mirror 123 is concave. This can increase the size of virtual image I2, while suppressing aberration.

Combiner 113A in first display device 110 is a semi-transparent mirror reflecting a part of an incident light flux. Since combiner 113A is a semi-transparent mirror, virtual image I1 can be displayed as being superimposed on a scene ahead of observer D without blocking the scene.

First mirror 122 and second mirror 123 in second display device 120 may be semi-transparent mirrors that reflect a part of incident light flux, or mirrors that reflect entire light flux.

First display element 111 is disposed such that a normal vector on its display surface includes a component in the forward direction of car 200. Second display element 121 is disposed such that a normal vector on its display surface includes a component in the backward direction of car 200. A screen generating an image using a liquid crystal display device with a backlight, an organic light-emitting diode (electroluminescence), a plasma display, or a projector can be used for first display element 111 and second display element 121.

As illustrated in FIG. 7, first display device 110 is disposed above second display device 120 in the vertical direction. In other words, first display element 111 is disposed inside dashboard 210 at the side close to opening 211 than second display device 120. Combiner 113A is disposed on dashboard 210.

Second optical system 129 is disposed above second display element 121 and below first display element 111. With this arrangement, each of first display device 110 and second display device 120 can be assembled into a module.

[4-2. Operation]

First display device 110 displays virtual image I1 in the fourth exemplary embodiment. The image displayed by first display element 111 is reflected through combiner 113A, and guided to point-of-view region 400 of observer D to be visually recognized as virtual image I1 by observer D. Second display device 120 displays virtual image I2. The image displayed by second display element 121 is reflected on first mirror 122, second mirror 123, and windshield 220, and guided to point-of-view region 400 of observer D to be visually recognized as virtual image I2 by observer D.

Description will be given below of the positional relation between first display device 110 and second display device 120, and optical paths of center optical path L1 of the display image of first display device 110 and center optical path L2 of the display image of second display device 120.

Center optical path L1 of an image emitted from first display element 111 passes through opening 211 of dashboard to be incident on combiner 113A. Center optical path L1 incident on combiner 113A and reflected thereon is guided to observer D and visually recognized as virtual image I1 by observer D.

Center optical path L2 emitted from second display element 121 is incident on first mirror 122 of second display device 120. Center optical path L2 is reflected on first mirror 122, and incident on second mirror 123 of second display device 120. Then, center optical path L2 reflected on second mirror 123 passes through opening 211 and is incident on windshield 220. Center optical path L2 incident on windshield 220 is reflected and guided to point-of-view region 400 to allow observer D to visually recognize virtual image I2.

A vector of center optical path L1 which is emitted from first display element 111 and then incident on combiner 113A has a component in the forward direction of car 200. On the other hand, a vector of center optical path L2 which is emitted from second display element 121 and then incident on windshield 220 has a component in the backward direction of car 200.

[4-3. Effect]

The display device in head-up display 100 is separated into first display device 110 and second display device 120, whereby the size in the depth direction and in the width direction of head-up display 100 can be decreased. The present exemplary embodiment can also provide head-up display 100 that can display a large-screen virtual image with a small space.

In head-up display 100 according to the fourth exemplary embodiment, first display element 111, which is a component on center optical path L1 and located just before combiner 113A, is disposed posterior to opening 211, and second mirror 123, which is a component on center optical path L2 and located just before windshield 220, is disposed anterior to opening 211. With the configuration in which first display element 111 that is a main component of first display device 110 and second mirror 123 that is a main component of second display device 120 are respectively disposed at the back and at the front of car 200 relative to opening 211 as described above, the space in housing 140 can effectively be used, whereby head-up display 100 can be downsized.

In addition, in head-up display 100, center optical paths L1 and L2 cross each other at the position near opening 211. Thus, opening 211 can be decreased, whereby entrance of external light into dashboard 210 can be prevented.

Since first display device 110 and second display device 120 are separately provided, a display distance or display size of a virtual image can be set for each display region.

In addition, assembling property can be enhanced by forming each of first display device 110 and second display device 120 into a module.

Fifth Exemplary Embodiment

Head-up display 100 according to a fifth exemplary embodiment will be described below with reference to FIG. 8.

[5-1. Configuration]

Figure 8:
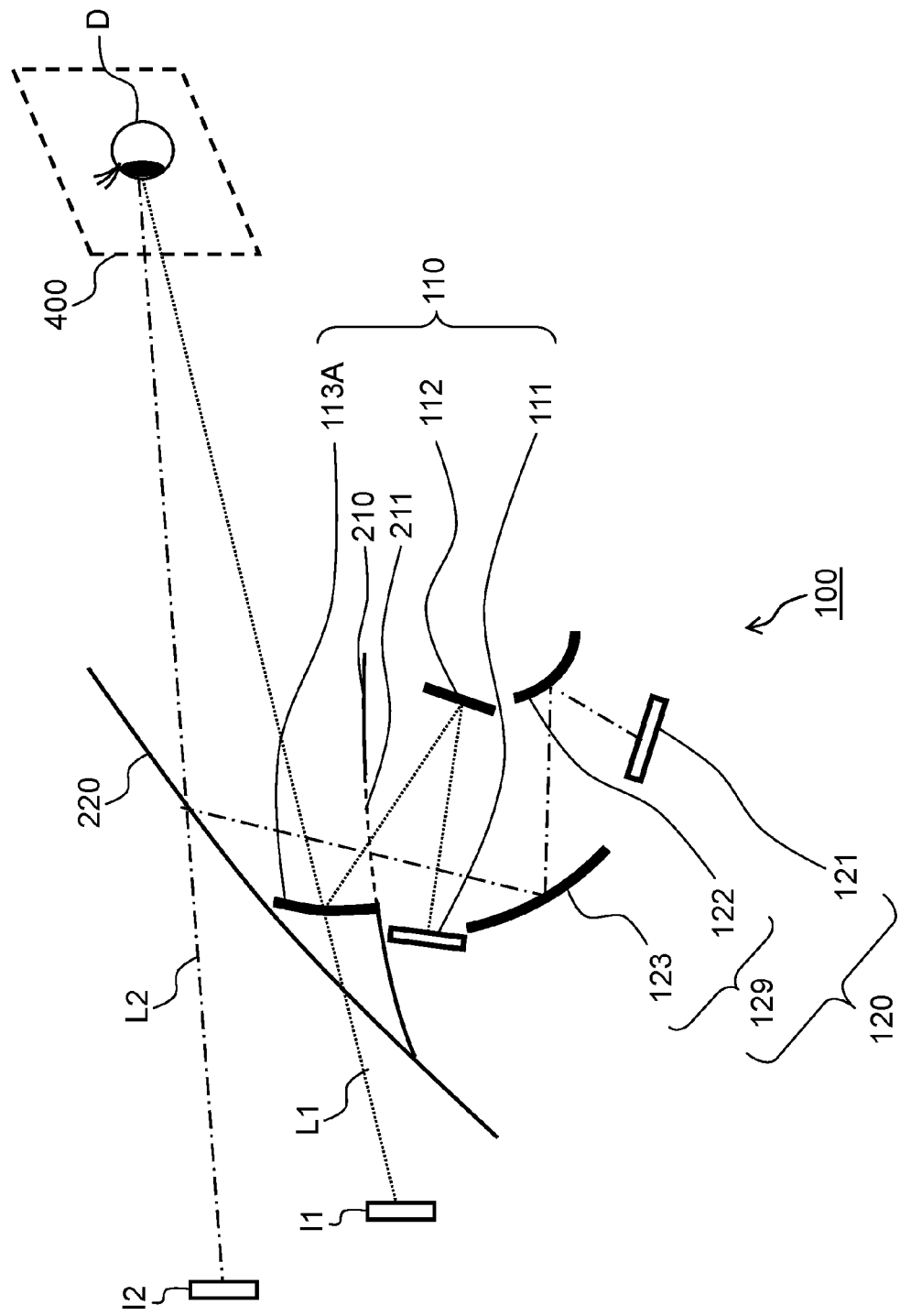
FIG. 8 is a schematic diagram illustrating a configuration of a head-up display according to a fifth exemplary embodiment.

FIG. 8 is a schematic diagram illustrating the configuration of head-up display 100 mounted to car 200 according to the fifth exemplary embodiment. Head-up display 100 includes first display device 110 and second display device 120. First display device 110 includes first display element 111 and first optical system 119. First optical system 119 includes first mirror 112 and combiner 113A. The reflection surface of combiner 113A is concave. First display element 111 is disposed at the front of car 200 and first mirror 112 is disposed at the back of car 200 relative to opening 211.

Second display device 120 includes second display element 121 and second optical system 129. Second optical system 129 includes first mirror 122 and second mirror 123 having larger reflection surface than first mirror 122. A reflection surface of first mirror 122 in second optical system 129 is convex, and a reflection surface of second mirror 123 is concave. First mirror 122 is disposed at the back of car 200 relative to opening 211. On the other hand, second mirror 123 is disposed at the front of car 200 relative to opening 211.

Combiner 113A in first display device 110 is a semi-transparent mirror reflecting a part of an incident light flux. Since combiner 113A is a semi-transparent mirror, virtual image I1 can be displayed as being superimposed on a scene ahead of observer D without blocking the scene.

First mirror 122 and second mirror 123 in second display device 120 may be semi-transparent mirrors that reflect a part of incident light flux, or mirrors that reflect entire light flux.

First display element 111 is disposed such that a normal vector on its display surface includes a component in the backward direction and vertically downward direction of car 200. Second display element 121 is disposed with its display surface facing the back of car 200. A screen generating an image using a liquid crystal display device, an organic light-emitting diode (electroluminescence), a plasma display, or a projector can be used for first display element 111 and second display element 121.

First display device 110 is disposed above second display device 120 in the vertical direction. Like second display element 121, first display element 111 and first mirror 112 in first optical system 119 are disposed inside dashboard 210. Combiner 113A is disposed on dashboard 210. Second optical system 129 in second display device 120 is disposed below first display element 111, and second display element 121 is disposed below second optical system 129. With this arrangement in which first display device 110 and second display device 120 are disposed for each region, each of first display device 110 and second display device 120 can be assembled into a module.

[5-2. Operation]

As illustrated in FIG. 8, first display device 110 displays virtual image I1 in the fifth exemplary embodiment. The image displayed by first display element 111 is reflected through first mirror 112, reflected through combiner 113A, and guided to point-of-view region 400 to be visually recognized as virtual image I1 by observer D.

Second display device 120 displays virtual image I2. The image displayed by second display element 121 is reflected through first mirror 122, reflected through second mirror 123, then reflected through windshield 220, and guided to point-of-view region 400 to be visually recognized as virtual image I2 by observer D.

Description will be given below of the positional relation between first display device 110 and second display device 120, and optical paths of center optical path L1 of first display device 110 and center optical path L2 of second display device 120.

Center optical path L1 of an image emitted from first display element 111 is reflected on first mirror 112, and passes through opening 211 of dashboard to be incident on combiner 113A. Center optical path L1 is reflected on combiner 113A and guided to observer D to allow observer D to visually recognize virtual image I1. Center optical path L2 emitted from second display element 121 is incident on first mirror 122 of second display device 120. Center optical path L2 is reflected on first mirror 122, and incident on second mirror 123 of second display device 120. Then, center optical path L2 passes between first display element 111 and first mirror 112 in first display device 110, passes between first mirror 112 of first display device 110 and combiner 113A, is incident on windshield 220, reflected on windshield 220, and then, guided to point-of-view region 400 to allow observer D to visually recognize virtual image I2.

A vector of center optical path L1 which is emitted from first display element 111 and then incident on combiner 113A has a component in the forward direction of car 200. On the other hand, a vector of center optical path L2 which is emitted from second display element 121 and then incident on windshield 220 has a component in the backward direction of car 200.

[5-3. Effect]

The display device is separated into first display device 110 and second display device 120, whereby the size in the depth direction and in the width direction of head-up display 100 can be decreased. The present exemplary embodiment can also provide head-up display 100 that can display a large-screen virtual image with a small space.

In head-up display 100 according to the fifth exemplary embodiment, first mirror 112, which is a component on center optical path L1 and located just before combiner 113A, is disposed posterior to opening 211, and second mirror 123, which is a component on center optical path L2 and located just before windshield 220, is disposed anterior to opening 211. With the configuration in which first mirror 112 that is a main component of first display device 110 and second mirror 123 that is a main component of second display device 120 are respectively disposed at the back and at the front of car 200 relative to opening 211 as described above, the space in housing 140 can effectively be used, whereby head-up display 100 can be downsized.

In addition, in head-up display 100, center optical paths L1 and L2 cross each other at the position near opening 211. Thus, opening 211 can be decreased, whereby entrance of external light into dashboard 210 can be prevented.

Since first display device 110 and second display device 120 are separately provided, a display distance or display size of a virtual image can be set for each display region.

In addition, assembling property can be enhanced by forming each of first display device 110 and second display device 120 into a module.

Sixth Exemplary Embodiment

Head-up display 100 according to a sixth exemplary embodiment will be described below with reference to FIG. 9.

[6-1. Configuration]

Figure 9:
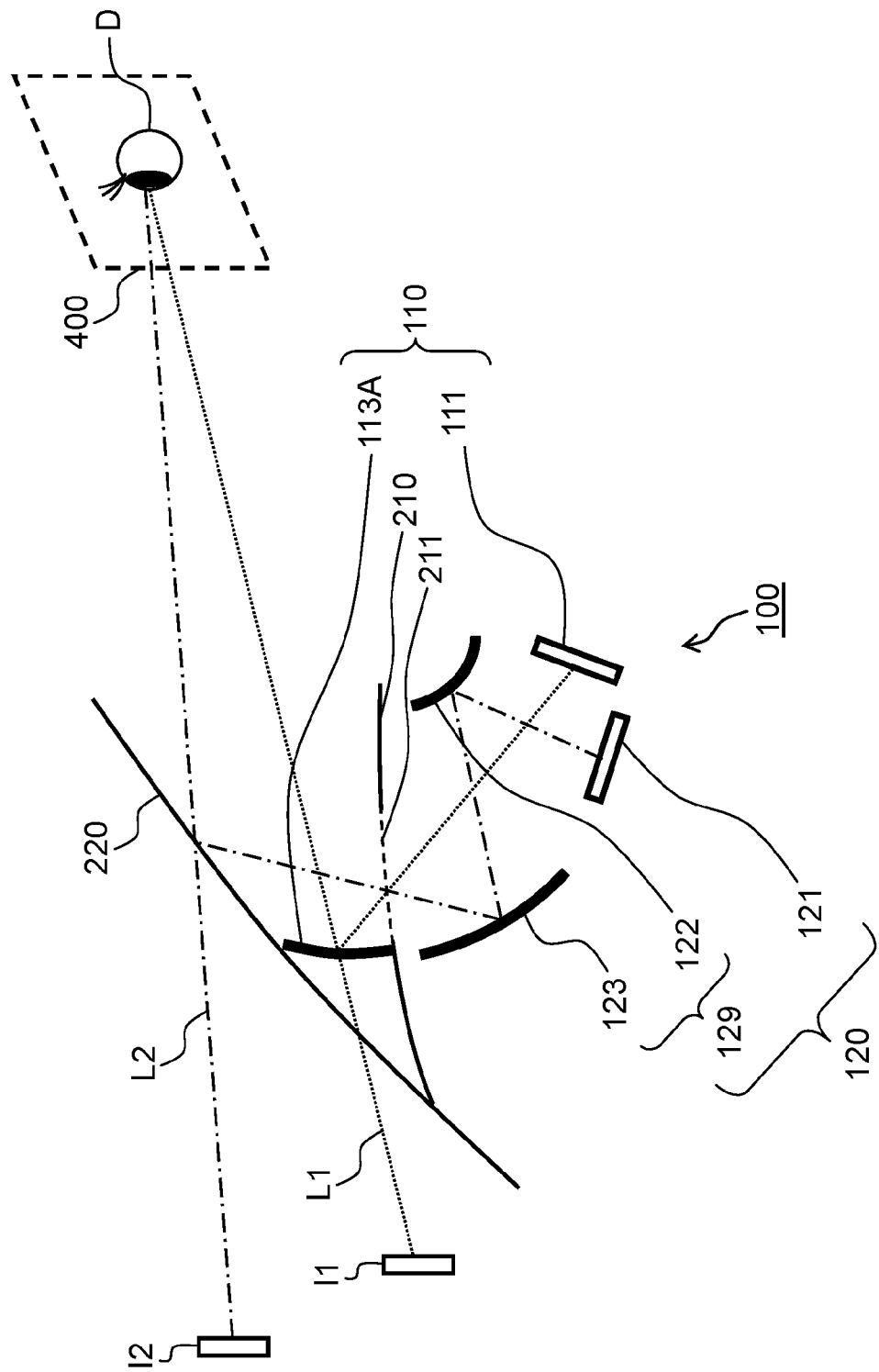
FIG. 9 is a schematic diagram illustrating a configuration of a head-up display according to a sixth exemplary embodiment.

FIG. 9 is a schematic diagram illustrating the configuration of head-up display 100 mounted to car 200 according to the sixth exemplary embodiment. Head-up display 100 includes first display device 110 and second display device 120. First display device 110 includes first display element 111 and combiner 113A. The reflection surface of combiner 113A is desirably concave. First display element 111 is disposed at the back of car 200 relative to opening 211. Second display device 120 includes second display element 121 and second optical system 129. Second optical system 129 includes first mirror 122 and second mirror 123 having larger reflection surface than first mirror 122. Desirably, a reflection surface of first mirror 122 in second optical system 129 is convex, and a reflection surface of second mirror 123 is concave. First mirror 122 is disposed at the back of car 200 relative to opening 211. On the other hand, second mirror 123 is disposed at the front of car 200 relative to opening 211.

Second display device 120 includes second display element 121 and second optical system 129. Second optical system 129 includes first mirror 122 and second mirror 123. Desirably, a reflection surface of first mirror 122 in second optical system 129 is convex, and a reflection surface of second mirror 123 is concave.

Combiner 113A in first display device 110 is desirably a semi-transparent mirror reflecting a part of an incident light flux. Since combiner 113A is a semi-transparent mirror, virtual image I1 can be displayed as being superimposed on a scene ahead of observer D without blocking the scene. First mirror 122 and second mirror 123 in second display device 120 may be semi-transparent mirrors that reflect a part of incident light flux, or mirrors that reflect entire light flux.

A screen generating an image using a liquid crystal display device, an organic light-emitting diode (electroluminescence), a plasma display, or a projector can be used for first display element 111 and second display element 121.

Like second display element 121, first display element 111 is mounted inside dashboard 210 (one example of a housing), and a normal vector on its display surface has a component in the forward direction of car 200. First display element 111 is provided below first mirror 122 in second display device 120 in the vertical direction and adjacent to second display element 121 at the back of car 200. Combiner 113A is disposed on dashboard 210.

Second display element 121 is disposed vertically below second optical system 129, and a normal vector on its display surface includes a component in the backward direction of car 200. A light-shielding wall may be provided between first display element 111 and second display element 121 to prevent emission light from entering display surfaces of these elements.

[6-2. Operation]

As illustrated in FIG. 9, first display device 110 displays virtual image I1 in the sixth exemplary embodiment. The image displayed by first display element 111 is reflected through combiner 113A, and guided to point-of-view region 400 of observer D to be visually recognized as virtual image I1.

As illustrated in FIG. 9, second display device 120 displays virtual image I2 in the sixth exemplary embodiment. The image displayed by second display element 121 is reflected on first mirror 122, second mirror 123, and windshield 220, and guided to point-of-view region 400 of observer D to be visually recognized as virtual image I2.

The positional relation between first display device 110 and second display device 120 and optical paths of center optical paths L1 and L2 will be described below.

Center optical path L1 emitted from first display element 111 sequentially passes between second display element 121 and first mirror 122 in second display device 120, between first mirror 122 and second mirror 123 in second display device 120, and through opening 211, is reflected on combiner 113A, and then, guided to observer D to allow observer D to visually recognize virtual image I1. According to this configuration, an optical path length can be secured, and dashboard 210 can be downsized.

A vector of center optical path L1 which is emitted from first display element 111 and then incident on combiner 113A has a component in the forward direction of car 200. On the other hand, a vector of center optical path L2 which is emitted from second display element 121 and then incident on windshield 220 has a component in the backward direction of car 200. This configuration can allow the optical paths of center optical paths L1 and L2, which pass through opening 211, to cross each other near opening 211, thereby being capable of decreasing opening 211. In head-up display 100 according to the sixth exemplary embodiment, center optical paths L1 and L2 cross each other at the position near opening 211. Thus, opening 211 can be decreased, whereby entrance of external light into dashboard 210 can be prevented.

[6-3. Effect]

The display device is separated into first display device 110 and second display device 120, whereby the size in the depth direction and in the width direction of head-up display 100 can be decreased. The present exemplary embodiment can also provide head-up display 100 that can display a large-screen virtual image with a small space.

In head-up display 100 according to the sixth exemplary embodiment, first display element 111, which is a component on center optical path L1 and located just before combiner 113A, is disposed posterior to opening 211, and second mirror 123, which is a component on center optical path L2 and located just before windshield 220, is disposed anterior to opening 211. With the configuration in which first display element 111 that is a main component of first display device 110 and second mirror 123 that is a main component of second display device 120 are respectively disposed at the back and at the front of car 200 relative to opening 211 as described above, the space in housing 140 can effectively be used, whereby head-up display 100 can be downsized.

In addition, in head-up display 100, center optical paths L1 and L2 cross each other at the position near opening 211. Thus, opening 211 can be decreased, whereby entrance of external light into dashboard 210 can be prevented.

Since first display device 110 and second display device 120 are separately provided, a display distance or display size of a virtual image can be set for each display region.

In the sixth exemplary embodiment, first display element 111 is disposed below first mirror 122 such that the light beam emitted from first display element 111 and incident on combiner 113A passes between second display element 121 and first mirror 122 in second display device 120. When first display element 111 is disposed as described above, the distance from first display element 111 to combiner 113A can be increased, whereby range of visibility of virtual image I1 viewed from observer D can be increased, and further, the size of head-up display 100 in the depth direction can be decreased.

Seventh Exemplary Embodiment

A seventh exemplary embodiment will be described below with reference to FIG. 10.

[7-1. Configuration]

Figure 10:
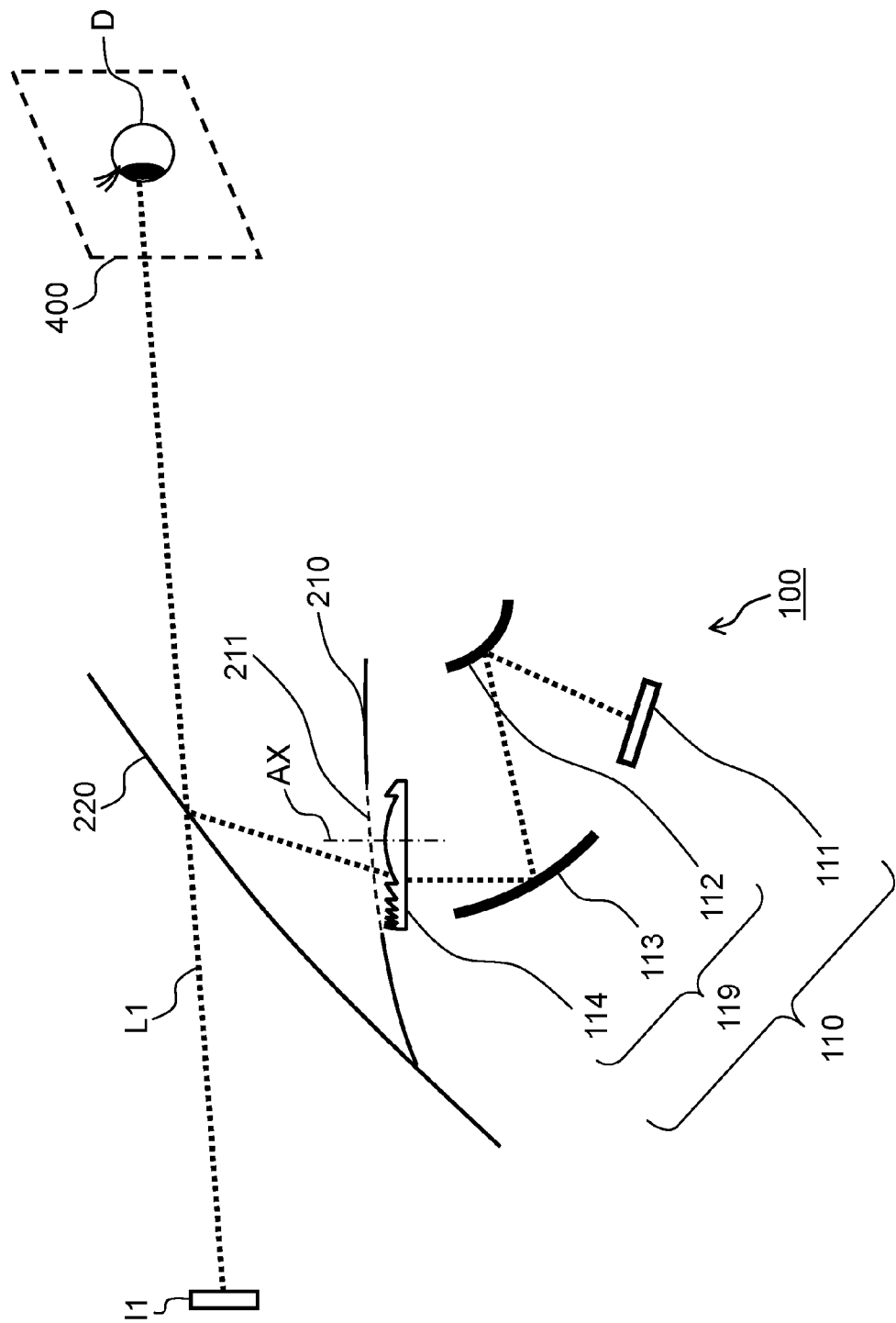
FIG. 10 is a schematic diagram illustrating a configuration of a head-up display according to a seventh exemplary embodiment.

FIG. 10 is a schematic diagram illustrating a cross-section of head-up display 100 according to the seventh exemplary embodiment. Head-up display 100 according to the seventh exemplary embodiment is mounted inside dashboard 210 of car 200. Head-up display 100 includes first display device 110. First display device 110 includes first display element 111 and first optical system 119. First optical system 119 includes first mirror 112, second mirror 113, and Fresnel lens 114. First mirror 112 and second mirror 113 form a reflection optical system. Fresnel lens 114 is one example of a refraction optical system composed of a member transmitting incident light. Desirably, a reflection surface of first mirror 112 in first optical system 119 is convex, and a reflection surface of second mirror 113 is concave. Fresnel lens 114 has a positive power, and has a Fresnel surface formed at an emission side. The position where center optical path L1 of an image emitted from the display region of first display element 111 is incident on Fresnel lens 114 is located at the side of windshield 220 of car 200, which is a vehicle, relative to center axis AX serving as a rotation center. Fresnel lens 114 has the Fresnel surface on the surface where center optical path L1 of the image displayed by first display element 111 is emitted.

With this configuration, center optical path L1 of the image reflected on second mirror 113 is deflected by Fresnel lens 114 serving as a refraction optical system, whereby a focal point of center optical path L1 of the image can be formed at the position visually recognizable by observer D according to the tilt of windshield 220. With the configuration in which an angle of a cutout groove of Fresnel lens 114 is formed to be nearly parallel to the emission light from Fresnel lens 114, flare of virtual image I1 can be reduced. With the configuration in which the Fresnel surface of Fresnel lens 114 is formed to be aspherical, monochromatic aberration can be corrected.

A screen generating an image using a liquid crystal display device, an organic light-emitting diode (electroluminescence), a plasma display, or a projector can be used for first display element 111.

As illustrated in FIG. 10, first display device 110 allows observer D to visually recognize virtual image I1 in the seventh exemplary embodiment. The image displayed by first display element 111 is reflected sequentially by first mirror 112 and second mirror 113, magnified by Fresnel lens 114, passes through opening 211 of dashboard 210, and then, is reflected on windshield 220 to be guided to point-of-view region 400 of observer D. With this, observer D can visually recognize virtual image I1.

[7-2. Effect]

As described above, Fresnel lens 114 is used in first display device 110, whereby the size in the depth direction of head-up display 100 can be decreased.

In the present exemplary embodiment, the rotation center of Fresnel lens 114 is decentered toward the backward direction of car 200 from the position where a center light beam emitted from the center of first display element 111 is incident on Fresnel lens 114, by which the light reflected by second mirror 113 is refracted toward the back of car 200. According to this configuration, the position of second mirror 113 can be shifted toward the front of the vehicle, compared to the case where Fresnel lens 114 is not used. Generally, vehicle structures such as meter panels are mounted in dashboard 210 of car 200. With the configuration in which the position of second mirror 113 is shifted toward the front of the vehicle, the interference between second mirror 113 and vehicle structures in dashboard 210 can be reduced. Accordingly, mounting property of head-up display 100 to a vehicle can be enhanced.

In addition, first display device 110 according to the present exemplary embodiment can be formed into a module, whereby assembling property can be enhanced.

Other Exemplary Embodiments

As presented above, the first to seventh exemplary embodiments have been described as an example of the technology described in the present application. However, the technology in the present disclosure is not limited to these, and can be applied to embodiments in which various changes, replacements, additions, omissions, or the like are made.

Other exemplary embodiments will be described below.

In the first to seventh exemplary embodiments, the number of mirrors in an optical system is not limited to two, but can be changed according to a display distance of a virtual image or a size of a display element. When the head-up display according to the present disclosure is mounted inside a vehicle, the number of times of folding a light flux of a display image can be changed according to a size of a space where the head-up display is mountable, and the number of mirrors can be changed, as necessary, according to this change.

In the first to sixth exemplary embodiments, a part of a second mirror in a second optical system can be formed into a semi-transparent mirror, and the semi-transparent part may be located on a path of a part of a light flux from a first optical system. With this configuration, different display regions can continuously be joined.

The first to sixth exemplary embodiments describe that first region 221 where virtual image I1 is displayed and second region 222 where virtual image I2 is displayed are not overlapped with each other. However, depending on a display content, a mirror in a first optical system and a mirror in a second optical system may be disposed such that a part of first region 221 and a part of second region 222 are overlapped with each other.

The seventh exemplary embodiment describes that head-up display 100 includes one display device which is first display device 110. However, the head-up display can be configured to include two display devices as in the first to sixth exemplary embodiments.

In the seventh exemplary embodiment, Fresnel lens 114 is used for a part of an optical system. However, second mirror 113 can be downsized even by using a convex lens other than Fresnel lens 114. In addition, Fresnel lens 114 may be disposed in place of a cover for opening 211.

The seventh exemplary embodiment describes a refraction optical system using Fresnel lens 114 which has a flat incidence surface and an emission surface formed into a Fresnel surface. However, a refraction optical system having a convex incidence surface may be used. Alternatively, a Fresnel lens which has an incidence surface formed into a Fresnel surface may be used as a refraction optical system.

The seventh exemplary embodiment describes the case in which the center axis of the refraction optical system is decentered toward the back of the vehicle from the incidence position where the center light beam is incident on the refraction optical system. However, the center axis of the refraction optical system may be decentered toward the front of the vehicle from the incidence position where the center light beam of the image is incident on the refraction optical system. In this case, the refraction optical system refracts the light reflected on the reflection optical system toward the front of the vehicle. Therefore, the position of the second mirror can be shifted toward the back of the vehicle, compared to the case where the center axis of the refraction optical system is not decentered. With the configuration in which the center axis of the refraction optical system is decentered toward the back or front of the vehicle as described above, the position of the second mirror in the front-back direction of the vehicle relative to the dashboard can be changed as necessary. Accordingly, the degree of freedom of mounting the second mirror can be enhanced.

The first to seventh exemplary embodiments describe the case where head-up display 100 is mounted inside car 200. However, head-up display 100 may be mounted in a vehicle other than a vehicle, such as an aircraft or an electric train.

As presented above, the exemplary embodiments have been described as an example of the technology according to the present disclosure. For this purpose, the accompanying drawings and the detailed description are provided.

Therefore, components in the accompanying drawings and the detail description may include not only components essential for solving problems, but also components that are provided to illustrate the above described technology and are not essential for solving problems. Therefore, such inessential components should not be readily construed as being essential based on the fact that such inessential components are shown in the accompanying drawings or mentioned in the detailed description.

Further, the above described embodiments have been described to exemplify the technology according to the present disclosure, and therefore, various modifications, replacements, additions, and omissions may be made within the scope of the claims and the scope of the equivalents thereof.

The present disclosure is applicable to a head-up display mounted to a vehicle having a windshield.

The invention claimed is:

1. A head-up display to be mounted to a vehicle having a windshield and configured to allow an observer to visually recognize a virtual image, the head-up display comprising:
   a first display element configured to display a first image;
   a first optical system configured to reflect the first image displayed by the first display element and project the first image onto the windshield;
   a second display element configured to display a second image; and
   a second optical system configured to reflect the second image displayed by the second display element and project the second image onto the windshield,
   wherein the first image projected by the first optical system is projected onto the windshield at a position below a position of the second image projected by the second optical system from a perspective of the observer during normal operation of the vehicle,
   wherein the second optical system has a first mirror and a second mirror arranged in order along an optical path from the first display element to the windshield, the second optical system being configured such that the second mirror reflects the second image reflected by the first mirror and projects the second image directly onto the windshield,
   wherein the second mirror has a reflection surface including a point, the point corresponding to a central position of the second image to be reflected by the reflection surface, and
   wherein a normal line to the reflection surface of the second mirror at the point has a component in a forward direction of the vehicle, the forward direction being a direction in which the observer faces during normal operation of the vehicle.

2. The head-up display according to claim 1, wherein the second optical system is disposed vertically above the first optical system from the perspective of the observer during normal operation of the vehicle.

3. The head-up display according to claim 1, wherein the first optical system and the second optical system are configured such that a light flux of the first image generated by the first display element crosses a light flux of the second image generated by the second display element plural times on an optical path from the first display element to the windshield.

4. The head-up display according to claim 1, wherein the first mirror in the second optical system comprises a part of a front panel composing a front part of a dashboard of the vehicle.

5. The head-up display according to claim 1, wherein the second mirror in the second optical system comprises a part of an antireflection cover covering the first optical system in a dashboard of the vehicle.

6. The head-up display according to claim 1, wherein the second display element and the second optical system are disposed vertically above the first display element and the first optical system, respectively, from the perspective of the observer during normal operation of the vehicle.

7. A head-up display to be mounted to a vehicle having a windshield and configured to allow an observer to visually recognize a virtual image, the head-up display comprising:
   a display element configured to display an image;
   an optical member configured to reflect and transmit a light flux of the image displayed by the display element;
   a first optical system configured to reflect the light flux reflected by the optical member and project the light flux onto the windshield as a first image; and
   a second optical system configured to reflect the light flux passing through the optical member and project the light flux onto the windshield as a second image,
   wherein the first image projected by the first optical system is projected onto the windshield at a position below a position of the second image projected by the second optical system from a perspective of the observer during normal operation of the vehicle, wherein the second optical system has a first mirror and a second mirror arranged in order along an optical path from the first display element to the windshield, the second optical system being configured such that the second mirror reflects the light flux reflected by the first mirror and projects the light flux onto the windshield as a second image, wherein the second mirror has a reflection surface including a point, the point corresponding to a central position of the second image to be reflected by the reflection surface, and wherein a normal line to the reflection surface of the second mirror at the point has a component in a forward direction of the vehicle, the forward direction being a direction in which the observer faces during normal operation of the vehicle.

8. A vehicle comprising:
a windshield; and
a head-up display configured to allow an observer to visually recognize a virtual image, the head-up display including:
   a first display element configured to display a first image;
   a first optical system configured to reflect the first image displayed by the first display element and project the first image onto the windshield;
   a second display element configured to display a second image; and
   a second optical system configured to reflect the second image displayed by the second display element and project the second image onto the windshield,
wherein the first image projected by the first optical system is projected onto the windshield at a position below a position of the second image projected by the second optical system from a perspective of the observer during normal operation of the vehicle,
wherein the second optical system has a first mirror and a second mirror arranged in order along an optical path from the first display element to the windshield, the second optical system being configured such that the second mirror reflects the second image reflected by the first mirror and projects the second image directly onto the windshield,
wherein the second mirror has a reflection surface including a point, the point corresponding to a central position of the second image to be reflected by the reflection surface, and
wherein a normal line to the reflection surface of the second mirror at the point has a component in a forward direction of the vehicle, the forward direction being a direction in which the observer faces during normal operation of the vehicle.

* * * * *